United States Patent
Demeester

[11] Patent Number: 6,034,353
[45] Date of Patent: Mar. 7, 2000

[54] LAMINATED HEATED PLATE GLASS, ESPECIALLY FOR AN AIRPLANE COCKPIT

[75] Inventor: Jean Demeester, Sully sur Loire, France

[73] Assignee: Saint-Gobain Vitrage, Courbevoie, France

[21] Appl. No.: 09/120,727

[22] Filed: Jul. 23, 1998

[30] Foreign Application Priority Data

Jul. 23, 1997 [FR] France .................. 97 09347

[51] Int. Cl.[7] ................. H05B 3/86; B64C 1/14
[52] U.S. Cl. ............ 219/203; 219/522; 244/129.3; 52/171.2
[58] Field of Search ................ 219/522, 203, 219/543, 544, 547; 428/192, 200, 38; 156/166; 52/171.2; 244/134 D, 129.3; 338/306–309

[56] References Cited

U.S. PATENT DOCUMENTS

| | | |
|---|---|---|
| 3,317,710 | 5/1967 | Boicey et al. |
| 3,974,359 | 8/1976 | Orcutt et al. ................ 219/522 |
| 4,128,448 | 12/1978 | Bitterice et al. ............ 156/166 |
| 4,278,875 | 7/1981 | Bain . |
| 4,284,677 | 8/1981 | Herliczek .................... 428/192 |
| 4,817,347 | 4/1989 | Hand et al. ................. 52/171.3 |

FOREIGN PATENT DOCUMENTS

| | | |
|---|---|---|
| 0376192 | 7/1990 | European Pat. Off. . |
| 1 390519 | 6/1965 | France . |
| 2612174 | 9/1988 | France . |
| 1942903 | 2/1970 | Germany . |

*Primary Examiner*—John A. Jeffrey
*Attorney, Agent, or Firm*—Oblon, Spivak, McClelland, Maier & Neustadt, P.C.

[57] ABSTRACT

In a laminated heated plate glass, especially for an airplane cockpit, the plate glass includes at least two sheets of structural glass (12, 14) which are secured in a rabbet of the cockpit and connected to one another by a first intermediate layer (16) made of transparent plastic material, at least one third sheet, made of glass (18), which is not secured in the rabbet and which is connected to the external sheet of structural glass (14) through the intermediary of a second intermediate layer (20) made of plastic, and conducting devices in a thin layer (26) which are arranged between two current input strips (28), which are connected to a source of current. The connecting devices (26) are arranged in the thickness of the plate glass, on the outside of the set of the two sheets of structural glass (12, 14), on the side facing the outside of the cockpit.

12 Claims, 1 Drawing Sheet

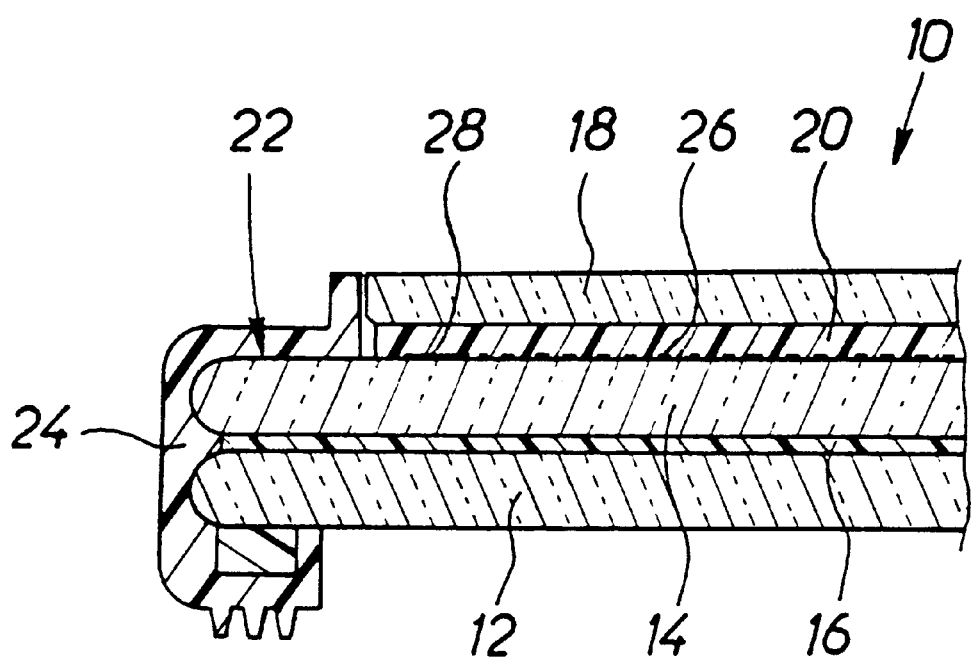

LAMINATED HEATED PLATE GLASS, ESPECIALLY FOR AN AIRPLANE COCKPIT

BACKGROUND OF THE INVENTION

1. Field of the Invention

This invention pertains to a laminated heated plate glass, especially for an airplane cockpit.

2. Description of the Related Art

An airplane window normally includes at least two sheets of structural glass connected to one another by a first intermediate layer made of transparent plastic, for example polyvinylbutyral (PVB) or of polyurethane, the sheet of structural glass which faces the external side of the cockpit being covered by at least one third sheet, made of tempered glass or glass reinforced chemically through the intermediary of another intermediate layer made of PVB or of polyurethane.

The third sheet and the second intermediate layer have dimensions which are reduced with respect to those of the two sheets of structural glass, so as to form on the latter a peripheral overlapping edge which is to be received in a rabbet of the cockpit.

In order that a plate glass of this type can be heated, it is known to place a network of thin, generally parallel conducting wires or an electrically conducting film between the first intermediate layer and the sheet of glass which is turned toward the outside, during fabrication, these components being connected to two current input strips or collectors which are connected to a source of current external to the plate glass.

Under normal conditions of use which prevail during flight, the plate glass is subjected to stresses due to pressure and temperature differences between the two sides of the plate glass, which generate shearing forces between the different layers of the plate glass and therefore relative displacement of the different components which comprise the laminated structure, and in particular displacement of the first intermediate layer and current input strips with respect to the wires. Due to this displacement, there can occur a rupture of the electric wires and therefore a disturbance in the temperature regulation of the plate glass. Short circuits and localized overheated spots can occur, possibly causing breakage of one or even both sheets of structural glass.

SUMMARY OF THE INVENTION

It is an object of the present invention to assure that at least one of the sheets of structural glass will remain intact, irrespective of the stresses to which the laminated heated plate glass is subjected during use.

According to a feature of the invention, the above and other objects are achieved by a laminated plate glass comprising at least two sheets of structural glass which are connected to one another by a first intermediate layer made of transparent plastic, at least one third sheet having dimensions smaller than the at least two sheets of structural glass, said at least one third sheet being connected to one of the sheets of structural glass via a second intermediate layer made of plastic, and a conductive heating element connectable to a source of electrical current external to the laminated plate glass, said conductive heating element being arranged within the thickness of the laminated plate glass and outside of the thickness of the at least two sheets of structural glass.

According to another feature of the invention, the above and other objects are achieved by an airplane cockpit window comprising a rabbet frame; a laminated plate glass mounted in the rabbet frame so as to have an inside side facing the cockpit and an outside side facing away from the cockpit, the laminated plate glass comprising at least two sheets of structural glass which are secured to the rabbet frame and are connected to one another by a first intermediate layer made of transparent plastic, and at least one third sheet not secured to the rabbet frame, said at least one third sheet being connected to an outside one of the sheets of structural glass via a second intermediate layer made of plastic; and a conductive heating element connectable to a source of electrical current external to the window, said conductive heating element being arranged within the thickness of the laminated plate glass and outside of the thickness of the at least two sheets of structural glass.

In one particular mode of implementation, the conductive elements are arranged between the sheet of structural glass which is turned toward the outside of the cockpit and the second intermediate layer. By virtue of this arrangement, the network of wires or the electrically conducting film are displaced at a greater distance from the sheet of structural glass facing the inside of the cockpit, which is not the case in the conventional heated plate glass. The result is that even if the disturbances described previously do occur, only the sheet of structural glass on the outside will break, while the internal sheet structural glass will remain intact.

While there is the risk that the third sheet of glass will break at the same time that the sheet of glass facing the outside breaks, this will cause no loss of safety since the third sheet of glass is not structural and so is not secured in the cockpit rabbet.

Another advantage of the plate glass in accordance with the invention lies in the fact that the heating power can be increased in order to produce a sufficient temperature on the internal side of the sheet of internal structural glass to eliminate the condensation which forms there.

BRIEF DESCRIPTION OF THE DRAWINGS

An embodiment of the invention will now be described with respect to the single attached FIGURE which shows a partial perspective view of a heated laminated plate glass in accordance with the invention.

DETAILED DESCRIPTION OF THE PREFERRED EMBODIMENT

The heated plate glass 10 for an airplane cockpit shown in the FIGURE includes, in a conventional manner, two sheets of structural glass 12 and 14 which are connected to one another by the intermediary of an intermediate layer 16 made of transparent plastic. The sheet of glass 14 facing the outside of the cockpit is covered on its external side by a third glass sheet 18 through the intermediary of a second plastic intermediate layer 20.

The size of the sheet 18 and the intermediate layer 20 is reduced with respect to the two sheets of structural glass. A peripheral overlapping edge 22 is thus formed on the latter, by which the plate glass can be secured in a rabbet of the cockpit, not shown here. A ring-shaped joint 24 made of silicone is secured around the said edge.

In accordance with the invention, during fabrication of the plate glass, conductive elements in a thin layer, such as a network of thin and parallel electric wires 26 or an electrically conducting film, distributed over all or part of the surface area of the plate glass, are inserted between the sheet of structural glass 14 and the second intermediate layer 20. For example, the network of electric wires may be placed on the second intermediate layer 20 and this assembly is subsequently heated in such a manner that the network becomes embedded in the intermediate layer 20, after which the assembly is placed on the sheet of structural glass 14. Alternatively, the electrically conducting film is placed on the sheet of structural glass 14, and then the intermediate layer 20 is placed on this assembly. The electrically conducting film can be made of tin oxide doped with indium or fluorine.

The network of electric wires 26 or the electrically conducting film are connected to two current input strips, of which only one 28 is shown on the FIGURE. These strips are connected to a source of current external to the plate glass. In the FIGURE the strip 28 has been shown in the same plane as the conducting wires, but it can also be shifted to other layers of the window.

One will note that the network of wires 26 and the current input strip 28 are separated from the internal sheet of structural glass 12 by a relatively large thickness of material. The result is that if a short circuit does occur in the network of wires, any damage would be caused to the components of the window which are in contact with the wires, but in no case to the sheet of internal glass 12. Even a window damaged in this manner could still resist the differential pressures that exist between the external environment and the internal environment.

I claim:

1. A laminated plate glass, comprising:
   at least two sheets of structural glass which are connected to one another by a first intermediate layer made of transparent plastic,
   at least one third sheet having dimensions smaller than the at least two sheets of structural glass, said at least one third sheet being connected to one of the sheets of structural glass via a second intermediate layer made of plastic, and
   a conductive heating element connectable to a source of electrical current external to the laminated plate glass, said conductive heating element being arranged within the thickness of the laminated plate glass and between the one of the sheets of structural glass and the second intermediate layer.

2. The laminated heated plate glass according to claim 1, wherein said conductive heating element comprises a network of thin conducting wires which are substantially parallel to one another.

3. The laminated heated plate glass according to claim 1, wherein said conductive heating element comprises a thin layer of an electrically conducting film of tin oxide doped with indium or fluorine.

4. The laminated heated plate glass according to claim 1, wherein said conductive heating element comprises a thin layer made of one from the group consisting of tin oxide doped with indium and tin oxide doped with fluorine.

5. The laminated heated plate glass according to claim 1, including current input strips for connecting said conductive heating element to a source of electrical current, said current input strips not being arranged between the one of the sheets of structural glass and the second intermediate layer.

6. The laminated heated plate glass according to claim 1, wherein said third sheet is made of glass.

7. An airplane cockpit window comprising:
   a rabbet frame;
   a laminated plate glass mounted in the rabbet frame so as to have an inside side facing the cockpit and an outside side facing away from the cockpit, the laminated plate glass comprising at least two sheets of structural glass which are secured to the rabbet frame and are connected to one another by a first intermediate layer made of transparent plastic, and at least one third sheet not secured to the rabbet frame, said at least one third sheet being connected to an outside one of the sheets of structural glass via a second intermediate layer made of plastic; and
   a conductive heating element connectable to a source of electrical current external to the window, said conductive heating element being arranged within the thickness of the laminated plate glass and between the one of the sheets of structural glass and the second intermediate layer.

8. The airplane cockpit window according to claim 7, wherein said conductive heating element comprises a network of thin conducting wires which are substantially parallel to one another.

9. The airplane cockpit window according to claim 7, wherein said conductive heating element comprises a thin layer of an electrically conducting film of tin oxide doped with indium or fluorine.

10. The airplane cockpit window according to claim 7, wherein said conductive heating element comprises a thin layer of one from the group consisting of tin oxide doped with indium and tin oxide doped with fluorine.

11. The airplane cockpit window according to claim 7, including current input strips for connecting said conductive heating element to a source of electrical current, said current input strips not being arranged between the one of the sheets of structural glass and the second intermediate layer.

12. The laminated heated plate glass according to claim 7, wherein said third sheet is made of glass.

* * * * *